US005787518A

United States Patent [19]
Mendelovich et al.

[11] Patent Number: 5,787,518
[45] Date of Patent: Aug. 4, 1998

[54] CONVERTIBLE TOILET SEAT

[75] Inventors: Yisrael Mendelovich, Rehovot; Shlomo Nevo, Tel Aviv, both of Israel

[73] Assignee: Litaf Industries (1994) Ltd., Rehovot, Israel

[21] Appl. No.: 762,934

[22] Filed: Dec. 10, 1996

[30] Foreign Application Priority Data

Dec. 14, 1995 [IL] Israel ........................ 116403

[51] Int. Cl.⁶ .................... A47K 11/02; A47K 17/02
[52] U.S. Cl. .................. 4/449; 4/239; 4/483; 297/130; 182/33.6
[58] Field of Search .................. 4/449, 235, 237, 4/239, 254, 479, 480, 483, 484, 902; 297/118, 130; 182/33.5, 33.6

[56] References Cited

U.S. PATENT DOCUMENTS

| | | | |
|---|---|---|---|
| 393,169 | 11/1888 | McGowan | 182/33.2 |
| 1,297,177 | 3/1919 | Johnson | |
| 1,737,163 | 11/1929 | Keppinger | 4/239 |
| 2,120,481 | 6/1938 | Bentz | 4/254 |
| 2,122,832 | 7/1938 | Bentz | 4/254 |
| 2,607,926 | 8/1952 | Puy | 4/254 |
| 2,629,882 | 3/1953 | Blumenshine | 4/254 |
| 2,649,139 | 8/1953 | Singleton | 155/131 |
| 2,698,440 | 1/1955 | Lyons | 4/254 |
| 2,752,610 | 7/1956 | Mabrey | 4/237 |
| 2,992,439 | 7/1961 | Van Tassel | 4/239 |
| 3,383,714 | 5/1968 | Minasian | 4/254 |
| 4,205,404 | 6/1980 | Levins | 4/254 |
| 4,466,140 | 8/1984 | Sakamoto | 4/254 |
| 4,534,072 | 8/1985 | Lipski | 4/237 |
| 4,635,303 | 1/1987 | Shih | 4/254 |
| 4,645,261 | 2/1987 | Bourne et al. | 297/118 |
| 4,777,672 | 10/1988 | Gebhard et al. | 4/449 |

FOREIGN PATENT DOCUMENTS

| | | |
|---|---|---|
| 812141 | 4/1937 | France . |
| 595534 | 3/1934 | Germany . |
| 2010637 | 2/1972 | Germany . |
| 69189 | 7/1983 | Israel . |
| 009318 | 5/1900 | United Kingdom . |
| 501354 | 5/1938 | United Kingdom . |
| 756852 | 9/1956 | United Kingdom . |

OTHER PUBLICATIONS

Brochure: Primo Feedom Trainer Deluxe, Primo 149 Shaw Avenue, Irvington, N.J. 07111, U.S.A. no date.
Brochure: Nursery Needs, Sanitoy Inc., Nursery Lane, P.O. Box 2167, Fitchburg, MA. 01420, U.S.A. no date.

Primary Examiner—Charles R. Eloshway
Attorney, Agent, or Firm—Ladas & Parry

[57] ABSTRACT

A unitary lavatory seat assembly including a seat adapted for sitting thereon for lavatory purposes, the seat including a non-pivoting extension which extends from a forward portion of the seat, and a base pivotally attached to the seat along a pivot axis and arrangeable therewith in a first and a second orientation, wherein in the first orientation, the seat is supported by the extension and at least partially supported by a portion of the base at a rearward portion of the seat, the base being swung about the pivot axis to be positioned underneath the seat, and in the second orientation, the seat is placeable on a portion of a lavatory bowl and the base is swung about the pivot axis to be positioned forward of the extension, the base being adapted for stepping thereon, thereby to aid a user to climb and sit on the seat.

8 Claims, 4 Drawing Sheets

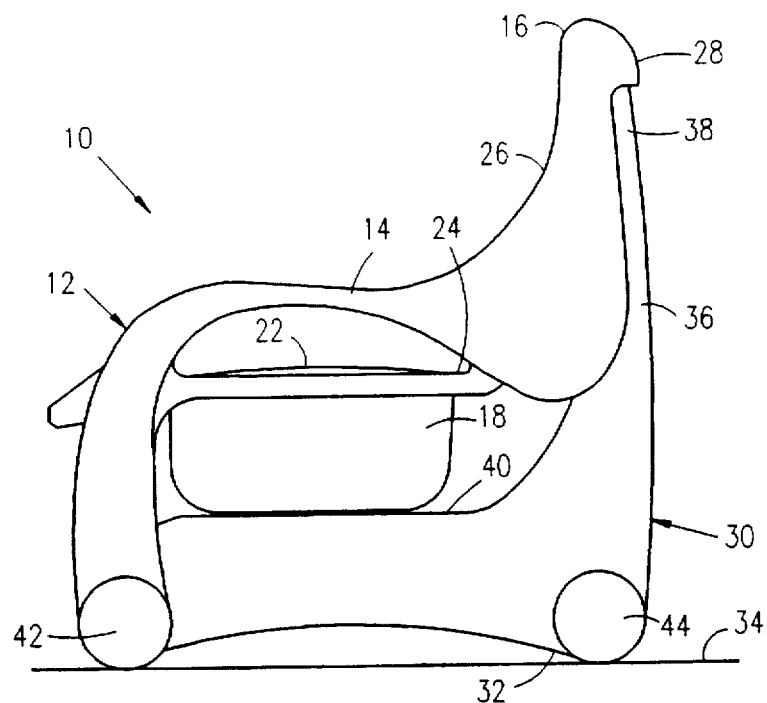
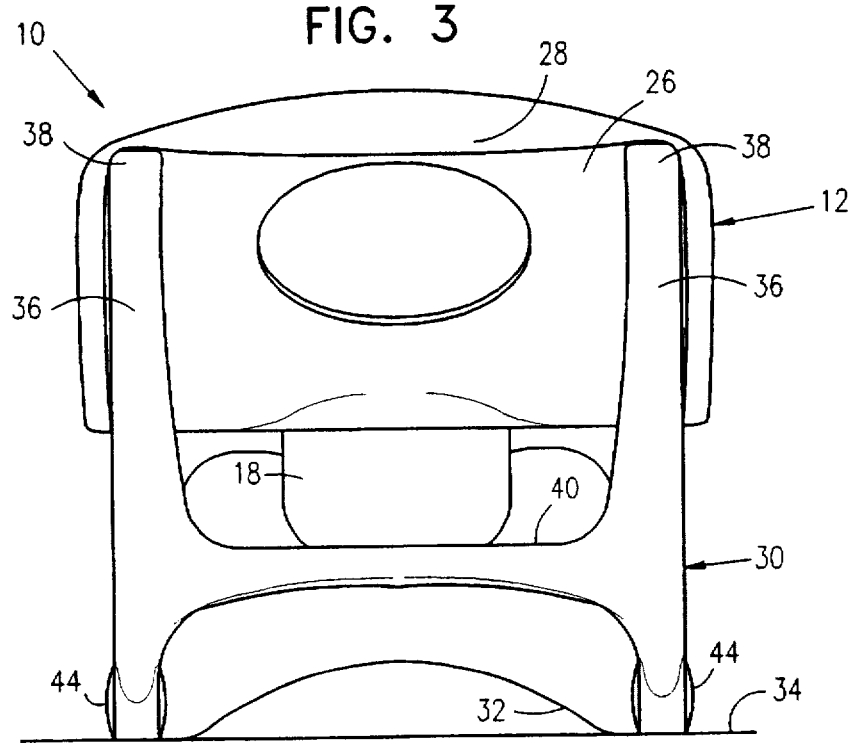

CONVERTIBLE TOILET SEAT

FIELD OF THE INVENTION

The present invention relates to lavatory seats generally.

BACKGROUND OF THE INVENTION

Many lavatory seats are known in the art. Some are suitable for use on the floor and some are suitable for helping a child climb and sit on a lavatory bowl.

U.S. Pat. Nos. 1,297,177, 2,120,481, 2,122,832, 2,607,926, 2,629,882, 2,649,139, 2,698,440, 2,752,610, 3,383,714, 4,205,404, 4,466,140, 4,534,072, 4,635,303, British Patents 009,318, 501,354, 756,852, German Patent 595,534 and French Patent 812,141 are believed to be representative of the art.

SUMMARY OF THE INVENTION

The present invention seeks to provide an improved convertible, lavatory seat assembly. In a first orientation, the assembly is suitable for placing and using on a floor, such as for a young child being toilet trained and not old enough to use a toilet in a lavatory room. The assembly may be easily and quickly converted to a second orientation which is suitable for placing on a lavatory bowl and allows a child to climb up and sit on a seat of the assembly positioned on the bowl.

There is thus provided in accordance with a preferred embodiment of the present invention a lavatory seat assembly including a seat adapted for sitting thereon for lavatory purposes, and a base, the seat being attached to the base and arrangeable therewith in a first and a second orientations, wherein in the first orientation, the seat is at least partially supported by the base thereunderneath, and in the second orientation, the seat is placeable on a portion of a lavatory bowl and the base is adapted for stepping thereon, thereby to aid a user to climb and sit on the seat.

In accordance with a preferred embodiment of the present invention, the base includes a support surface, wherein in the first orientation the support surface faces towards a floor and wherein in the second orientation the support surface faces away from the floor and is adapted for stepping thereon.

Additionally in accordance with a preferred embodiment of the present invention, the base includes at least one support arm, wherein in the first orientation the at least one support arm supports a portion of the seat and wherein in the second orientation the at least one support arm rests on the floor, thereby spacing the support surface from the floor.

Further in accordance with a preferred embodiment of the present invention, a face of the support surface which faces away from the floor in the second orientation, is substantially a non-slip surface.

In accordance with a preferred embodiment of the present invention, the base articulates with the seat.

Additionally in accordance with a preferred embodiment of the present invention, the assembly also includes a chamber pot, wherein the seat has an opening through which protudes a portion of the chamber pot.

Preferably the seat has a grasping portion suitable for grasping and carrying the assembly.

Preferably the seat has at least one arm rest.

BRIEF DESCRIPTION OF THE DRAWINGS

The present invention will be understood and appreciated more fully from the following detailed description, taken in conjunction with the drawing in which:

FIG. 2 is a simplified side view illustration of the lavatory seat assembly of FIG. 1;

FIG. 3 is a simplified rear view illustration of the lavatory seat assembly of FIG. 1;

DETAILED DESCRIPTION OF A PREFERRED EMBODIMENT

Figure 1:
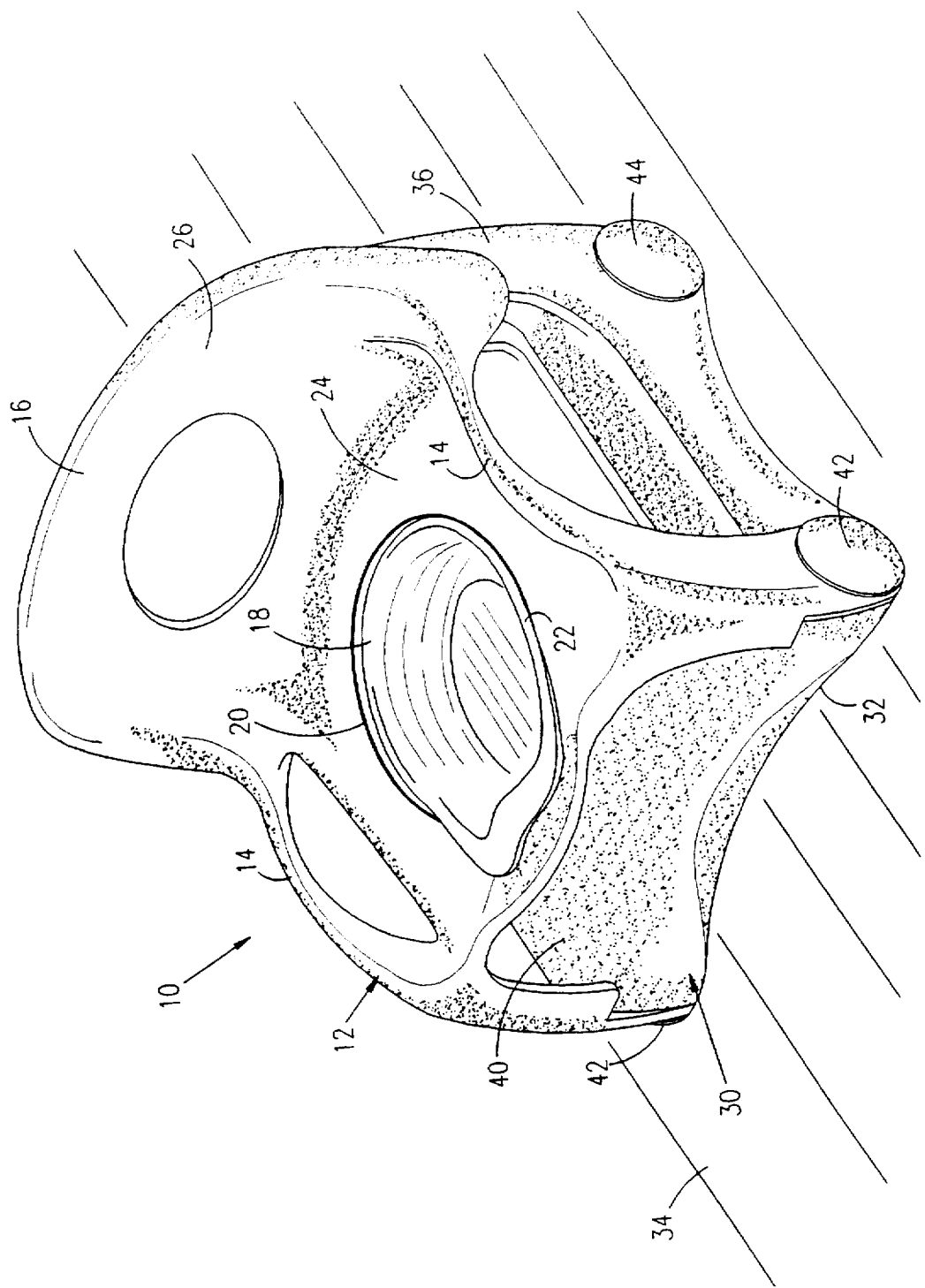
FIG. 1 is a simplified pictorial illustration of a lavatory seat assembly constructed and operative in accordance with a preferred embodiment of the present invention, in a first orientation.

Reference is now made to FIGS. 1–3 which illustrate a unitary lavatory seat assembly 10, constructed and operative in accordance with a preferred embodiment of the present invention, in a first orientation.

Lavatory seat assembly 10 includes a seat 12 adapted for sitting thereon for lavatory purposes. In accordance with a preferred embodiment of the present invention, seat 12 has arm rests 14, and a grasping portion 16 suitable for grasping and carrying lavatory seat assembly 10.

Lavatory seat assembly 10 also preferably includes a chamber pot 18. Seat 12 is preferably provided with an opening 20 (seen clearly in FIG. 6) for accommodating chamber pot 18. A rim 22 of chamber pot 18 preferably extends outwards of opening 20 and rests on a sitting surface 24 of seat 12. Seat 12 also preferably includes a back rest 26 and a rearwardly facing lip 28.

Lavatory seat assembly 10 also includes a base 30, which preferably includes a support surface 32. As seen in FIGS. 1–3, in the first orientation, support surface 32 faces towards a floor 34 and a portion thereof rests on floor 34. In accordance with a preferred embodiment of the present invention, base 30 also includes at least one, and preferably two, support arms 36. In the first orientation, support arms 36 are located behind back rest 26 of seat 12, and rearwardly facing lip 28 rests on an upper end 38 of each support arm 36, as seen best in FIGS. 2 and 3.

Chamber pot 18 may be sized to rest on an upper surface 40 of base 30, as seen in FIGS. 2 and 3. Alternatively, chamber pot 18 may be sized to be fully supported by rim 22 resting on surface 24.

In accordance with a preferred embodiment of the present invention, base 30 articulates with seat 12, preferably by means of hinges 42. Base 30 may be separable from and attachable to seat 12. Base 30 may also be provided with decorative buttons 44 to match hinges 42. Buttons 44 are not hinges and only serve to add decorative appeal to lavatory seat assembly 10.

Figure 4:
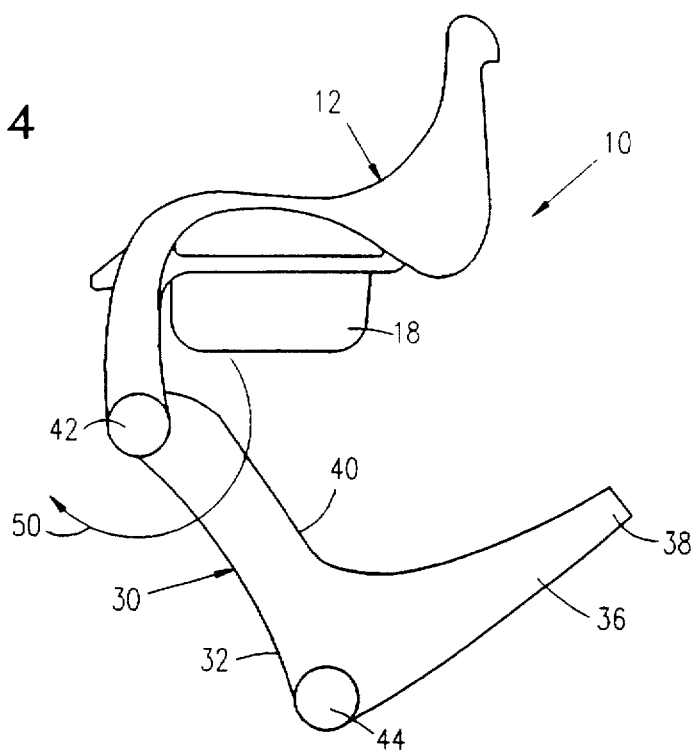
FIG. 4 is a simplified side view illustration of converting the lavatory seat assembly of FIG. 1 from the first orientation to a second orientation.
Figure 5:
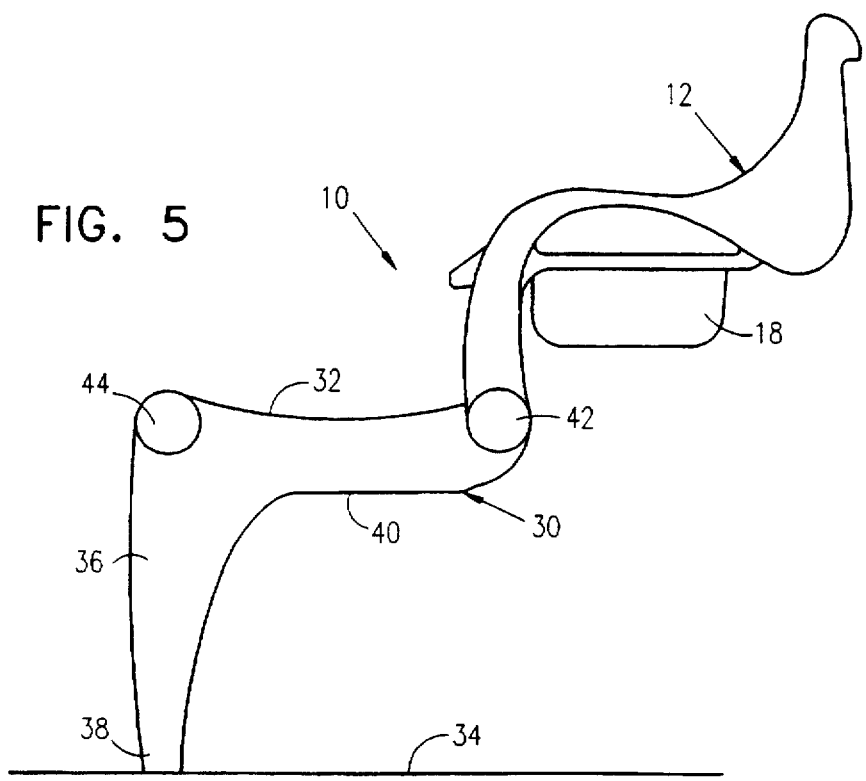
FIG. 5 is a simplified side view illustration of the lavatory seat assembly of FIG. 1, in the second orientation.
Figure 6:
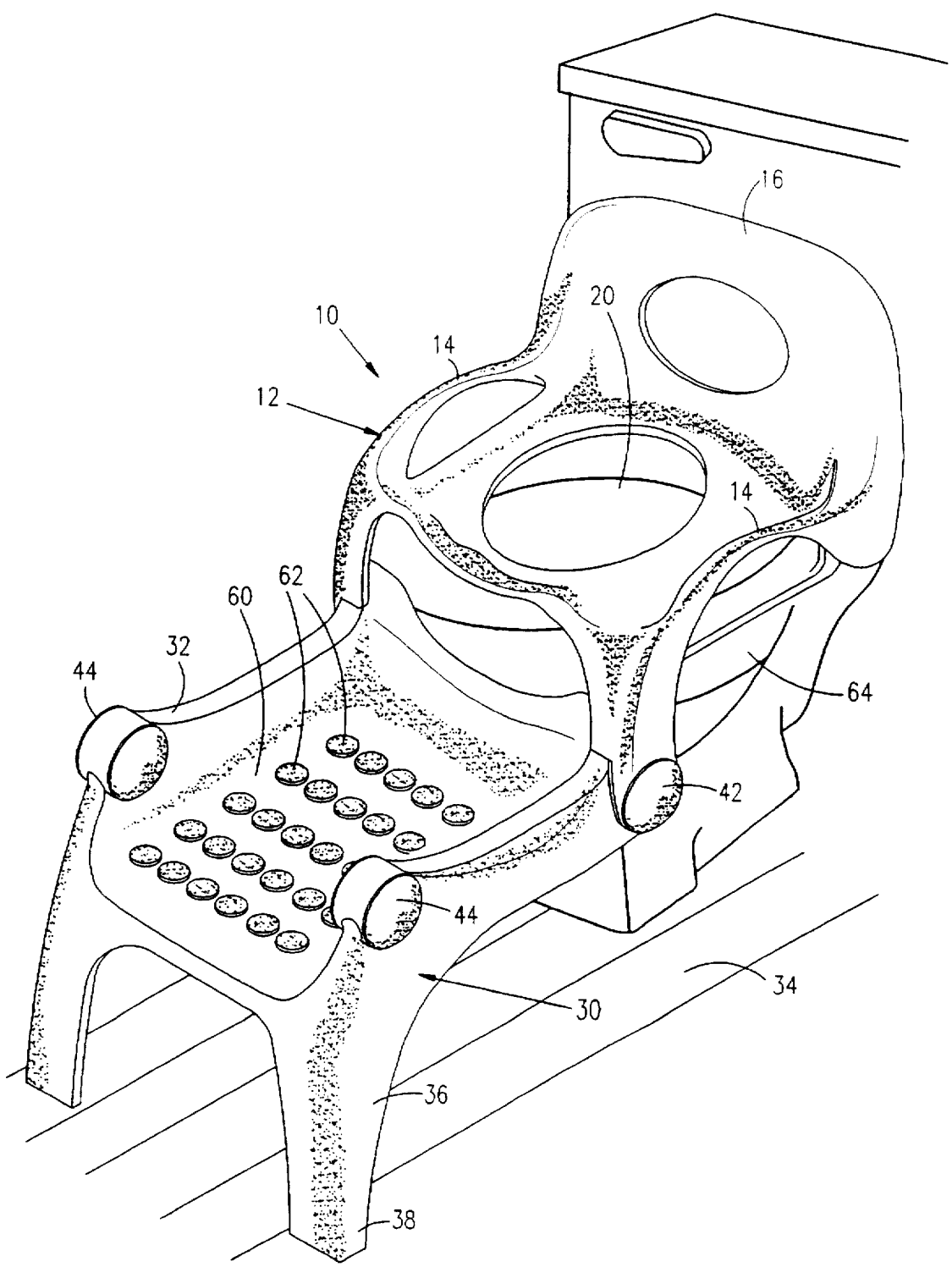
FIG. 6 is a simplified pictorial illustration of the lavatory seat assembly of FIG. 1, in the second orientation.

Reference is now made to FIGS. 4–6. By rotating base 30 about hinges 42 in the direction of an arrow 50, as seen in FIG. 4, lavatory seat assembly 10 is converted from the first orientation, shown in FIGS. 1–3, to the second orientation shown in FIGS. 5 and 6. As seen in FIGS. 5 and 6, support arms 36 rest on floor 34, thereby spacing support surface 32 from floor 34.

In the second orientation, support surface 32 faces away from floor 34 and is adapted for stepping thereon. As seen in FIG. 6, support surface 32 may be formed with a recessed surface 60 which preferably has non-slip protrusions 62 formed thereon. Non-slip protrusions 62 may help steady a child in stepping on recessed surface 60 in order to climb up and sit on seat 12. In the second orientation, auxiliary legs (not shown) may be attached to base 30 in the vicinity of hinges 42 for added support.

As seen in FIG. 6, in the second orientation, lavatory seat assembly may be placed on a lavatory bowl 64. Chamber pot 18 is normally removed when using lavatory seat assembly 10 in the second orientation.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the present invention is defined only by the claims which follow:

We claim:

1. A unitary lavatory seat assembly comprising:

a seat adapted for sitting thereon for lavatory purposes, said seat comprising a non-pivoting extension which extends from a forward portion of said seat; and a base pivotally attached to said seat along a pivot axis and arrangeable therewith in a first and a second orientation, wherein in said first orientation, said seat assembly is arranged to be used on a floor, wherein said seat is supported on said floor by said extension at said forward portion of said seat with a bottom end of said extension contacting said floor and at least partially supported on said floor by a portion of said base at a rearward portion of said seat, said base being swung about said pivot axis to be positioned underneath said seat, and in said second orientation, said seat is placeable on a portion of a lavatory bowl and said base is swung about said pivot axis to be positioned forward of said extension, said base being adapted for stepping thereon, thereby to aid a user to climb up to and sit on said seat.

2. An assembly according to claim 1 and wherein said base comprises a support surface, wherein in said first orientation said support surface faces towards said floor and wherein in said second orientation said support surface faces away from said floor and is adapted for stepping thereon.

3. An assembly according to claim 2 and wherein said base comprises at least one support arm, wherein in said first orientation said at least one support arm supports a portion of said seat and wherein in said second orientation said at least one support arm rests on said floor, thereby spacing said support surface from said floor.

4. An assembly according to claim 3 and wherein a face of said support surface which faces away from said floor in said second orientation, is substantially a non-slip surface.

5. An assembly according to claim 2 and wherein a face of said support surface which faces away from said floor in said second orientation, is substantially a non-slip surface.

6. An assembly according to claim 1 and also comprising a chamber pot, wherein said seat has an opening through which protrudes a portion of said chamber pot.

7. An assembly according to claim 6 and wherein a bottom surface of said chamber pot is supported by an upper surface of said base in said first orientation.

8. An assembly according to claim 1 and wherein said seat has a grasping portion suitable for grasping and carrying said assembly.

* * * * *